(12) United States Patent
Su (10) Patent No.: US 9,832,167 B2
(45) Date of Patent: Nov. 28, 2017

(54) METHOD FOR CONFIGURING INTERNET PROTOCAL ADDRESS OF SMALL CELL

(71) Applicants: AMBIT MICROSYSTEMS (SHANGHAI) LTD., Shanghai (CN); HON HAI PRECISION INDUSTRY CO., LTD., New Taipei (TW)

(72) Inventor: Jen-Chen Su, New Taipei (TW)

(73) Assignees: AMBIT MICROSYSTEMS (SHANGHAI) LTD., Shanghai (CN); HON HAI PRECISION INDUSTRY CO., LTD., New Taipei (TW)

(*) Notice: Subject to any disclaimer, the term of this patent is extended or adjusted under 35 U.S.C. 154(b) by 100 days.

(21) Appl. No.: 14/886,662

(22) Filed: Oct. 19, 2015

(65) Prior Publication Data

US 2017/0063780 A1    Mar. 2, 2017

(30) Foreign Application Priority Data

Aug. 28, 2015 (TW) .............................. 104128246 A (51) Int. Cl.
```
H04L 29/12      (2006.01)
H04L 29/06      (2006.01)
H04W 12/06      (2009.01)
H04L 9/32       (2006.01)
```
(Continued)

(52) U.S. Cl.
CPC ........ *H04L 61/2015* (2013.01); *H04L 9/3263* (2013.01); *H04L 61/2038* (2013.01); *H04L 61/2046* (2013.01); *H04L 63/0823* (2013.01); *H04W 12/06* (2013.01); *H04W 12/08* (2013.01); *H04L 61/203* (2013.01); *H04W 88/16* (2013.01)

(58) Field of Classification Search
None
See application file for complete search history.

(56) References Cited

U.S. PATENT DOCUMENTS

2011/0035592 A1*  2/2011  Cha ..................... H04L 63/205
                                                        713/169
2015/0237527 A1*  8/2015  Knutson ........... H04W 28/0289
                                                        726/4
(Continued)

FOREIGN PATENT DOCUMENTS

WO   2011060875 A1   5/2011
WO   2012134217 A2   10/2012
WO   2013126918 A1   8/2013

*Primary Examiner* — Diane Lo
(74) *Attorney, Agent, or Firm* — ScienBiziP, P.C.

(57) ABSTRACT

A method for configuring an Internet protocol (IP) address of a small cell includes determining whether the small cell has received authorization from a core network of a mobile operator, determining whether the core network has priority over a local network to connect to the small cell, obtaining a local IP address from a dynamic host configuration protocol (DHCP) function implemented in the small cell or in an access point of the local network of the small cell, and using a core network IP address assigned to the small cell by the core network when the core network has priority over the local network. The small cell determines whether the core network IP address is the same as the local IP address. When the core network IP address is the same as the local IP address, the local IP address of the small cell is changed.

11 Claims, 7 Drawing Sheets

(51) Int. Cl.
*H04W 12/08* (2009.01)
*H04W 88/16* (2009.01)

(56) References Cited

U.S. PATENT DOCUMENTS

2016/0219014 A1* 7/2016 Forsman ............... H04W 12/06
2016/0219017 A1* 7/2016 Kolhi .................. H04L 61/1511

* cited by examiner

| Attribute Type | Value | Multi-Valued | Length |
|---|---|---|---|
| INTERNAL_IP4_ADDRESS | 1 | Yes | 0 or 4 octets |
| INTERNAL_IP4_NETMASK | 2 | No | 0 or 4 octets |
| INTERNAL_IP4_DNS | 3 | Yes | 0 or 4 octets |
| INTERNAL_IP4_NBNS | 4 | Yes | 0 or 4 octets |
| INTERNAL_IP4_DHCP | 6 | Yes | 0 or 4 octets |
| APPLICATION_VERSION | 7 | No | 0 or more |
| INTERNAL_IP6_ADDRESS | 8 | Yes | 0 or 17 octets |
| INTERNAL_IP6_DNS | 10 | Yes | 0 or 16 octets |
| INTERNAL_IP6_DHCP | 12 | Yes | 0 or 16 octets |
| INTERNAL_IP4_SUBNET | 13 | Yes | 0 or 8 octets |
| SUPPORTED_ATTRIBUTES | 14 | No | Multiple of 2 |
| INTERNAL_IP6_SUBNET | 15 | Yes | 17 octets |
| ...... | ...... | ...... | ...... |

FIG. 4

| Attribute Type | Value | Multi-Valued | Length |
|---|---|---|---|
| INTERNAL_IP4_ADDRESS | 1 | Yes* | 0 or 4 octets |
| INTERNAL_IP4_NETMASK | 2 | No | 0 or 4 octets |
| INTERNAL_IP4_DNS | 3 | Yes | 0 or 4 octets |
| INTERNAL_IP4_NBNS | 4 | Yes | 0 or 4 octets |
| INTERNAL_IP4_DHCP | 6 | Yes | 0 or 4 octets |
| APPLICATION_VERSION | 7 | No | 0 or more |
| INTERNAL_IP6_ADDRESS | 8 | Yes | 0 or 17 octets |
| INTERNAL_IP6_DNS | 10 | Yes | 0 or 16 octets |
| INTERNAL_IP6_DHCP | 12 | Yes | 0 or 16 octets |
| INTERNAL_IP4_SUBNET | 13 | Yes | 0 or 8 octets |
| SUPPORTED_ATTRIBUTES | 14 | No | Multiple of 2 |
| INTERNAL_IP6_SUBNET | 15 | Yes | 17 octets |
| ...... | ...... | ...... | ...... |
| INTERNAL_IP4_LOCAL_SUBNET | 32700 | No | 0 or 8 octets |

METHOD FOR CONFIGURING INTERNET PROTOCAL ADDRESS OF SMALL CELL

FIELD

The subject matter herein generally relates to small cells, and more particularly to a small cell and a method of the small cell for configuring an Internet protocol address of the small cell.

BACKGROUND

Small cells are used in $3^{rd}$ Generation Partnership Project (3GPP) and mobile broadband networks to provide improved network access in homes and offices. The small cell can use a local Internet protocol (IP) address to connect to a local network or use a core network IP address to connect to a core network of a mobile operator.

BRIEF DESCRIPTION OF THE DRAWINGS

Implementations of the present technology will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "comprising" means "including, but not necessarily limited to"; it specifically indicates open-ended inclusion or membership in a so-described combination, group, series and the like.

In general, the word "script" as used hereinafter refers to logic embodied in hardware or firmware, or to a collection of software instructions, written in a programming language such as, for example, Java, C, or assembly. One or more software instructions in the scripts may be embedded in firmware such as in an erasable-programmable read-only memory (EPROM). It will be appreciated that the scripts may comprise connected logic units, such as gates and flip-flops, and may comprise programmable units, such as programmable gate arrays or processors. The scripts described herein may be implemented as either software and/or hardware scripts and may be stored in any type of computer-readable medium or other computer storage device.

Because the present disclosure relates to long term evolution (LTE) small cell technology, some related terms and acronyms will first be described below.

Figure 1:
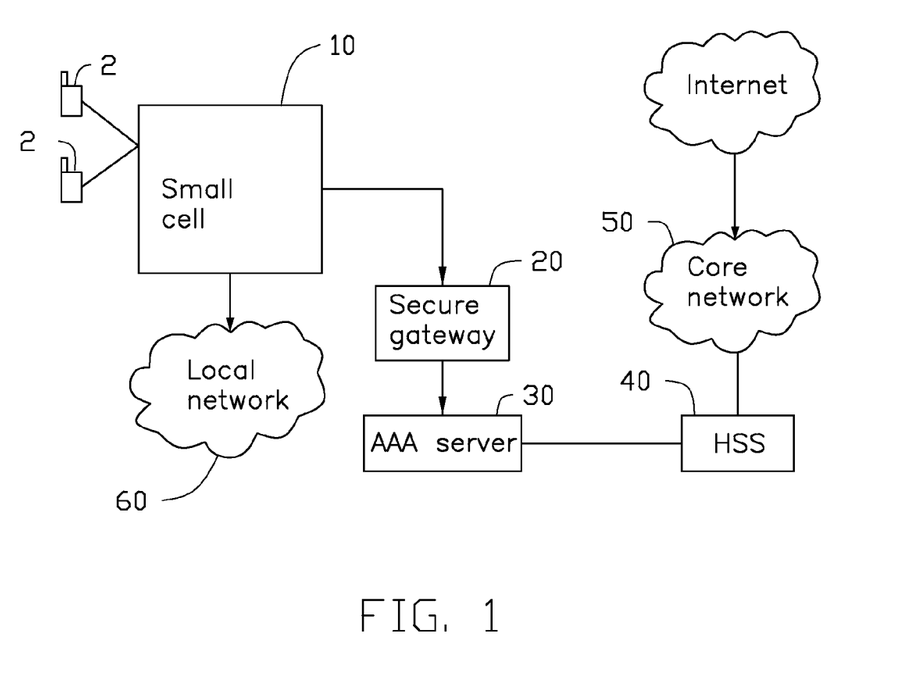
FIG. 1 is a block diagram of an embodiment of a network structure of a small cell.

IPSec: Security Architecture for IP network
AAA: Authentication, Authorization, Accounting
HSS: Home Subscriber Server
EAP-AKA: Extensible Authentication Protocol-Authentication and Key Agreement
IKE: Internet Key Exchange
SIM: Subscriber Identity Module
IP: Internet Protocol
DHCP: Dynamic Host Configuration Protocol FIG. 1 illustrates an embodiment of a network structure of a small cell 10. The network structure can include at least one user terminal 2, a secure gateway 20, a AAA server 30, an HSS 40, a core network 50, and a local network 60.

The small cell 10 can be in wireless communication with the at least one user terminal 2. The small cell 10 can establish connection for the at least one user terminal 2 with the core network 50 through a digital subscriber line or a broadband interface. The core network 50 can be provided by a mobile operator (not shown). The core network 50 can be different from the local network 60. In at least one embodiment, the core network 50 can be a third generation (3G) network or a fourth generation (4G) network. In at least one embodiment, the local network 60 can be a local area network. The user terminal 2 can be a mobile phone, a tablet computer, a printer, a fax machine, or the like.

The small cell 10 can include a SIM card (not shown). The SIM card can include identity (ID) information, information about the small cell 10, and configuration information of the small cell 10. The ID information can be concealed in an IKE packet transmitted through the secure gateway 20 to the AAA server 30, and the AAA server 30 can verify according to the ID information whether the small cell 10 can connect to the core network 50.

The secure gateway 20 can ensure security of the user terminal connecting to the core network 50.

The AAA server 30 can receive the IKE packet from the small cell 10 and verify the ID information to determine whether the small cell 10 can connect to the core network 50. In at least one embodiment, when the ID information is verified, the AAA server 30 transmits a "verification success" message to the secure gateway 20, and the secure gateway 20 can transmit the "verification success" message to the small cell 10.

The HSS 40 can complete registration of the small cell 10 for connecting to the core network 50. The HSS 40 can automatically complete IP connection and distribution for the small cell 10 and implement automatic software upgrades, automatic network planning, and the like for the small cell 10.

Figure 2:
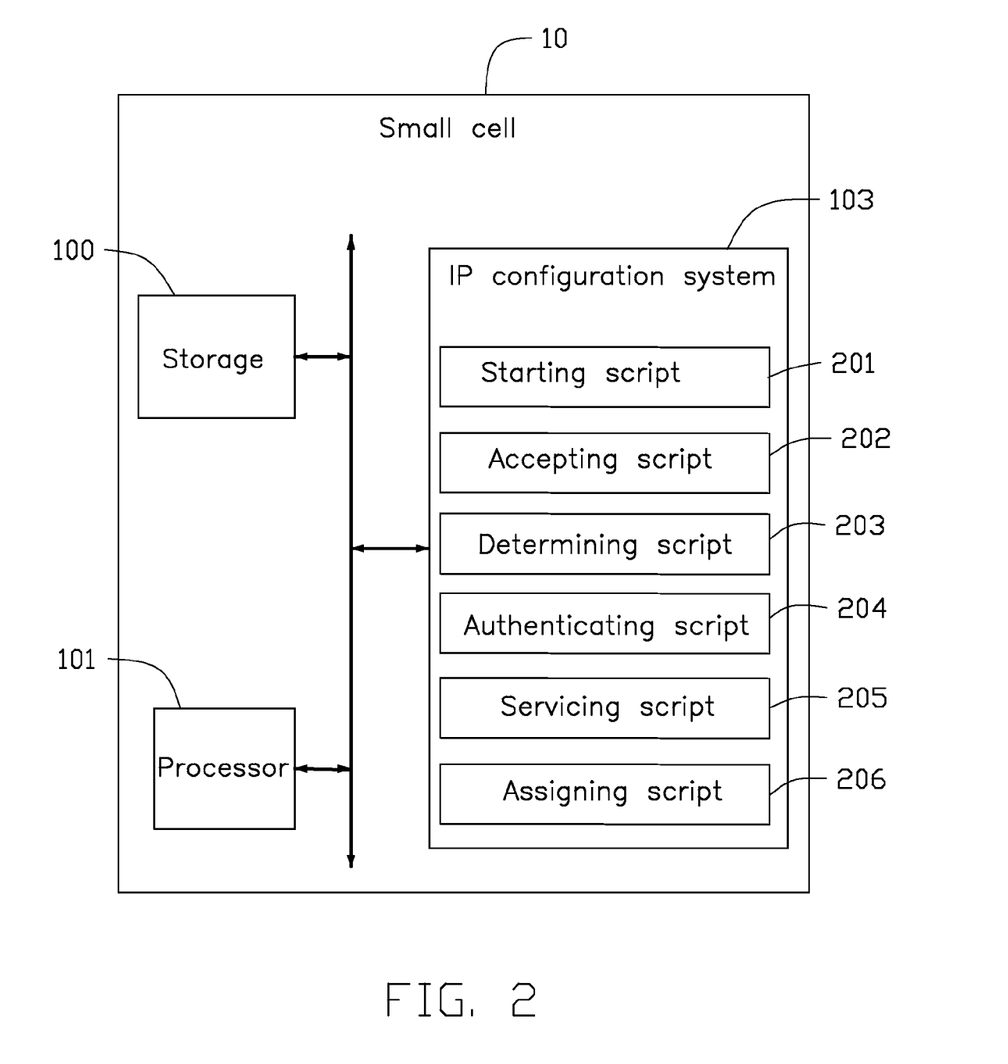
FIG. 2 is a block diagram of the small cell of FIG. 1.

As illustrated in FIG. 2, the small cell 10 can include a storage 100 and a processor 101. The small cell 10 can implement an IP configuration system 103. The IP configuration system 103 can include a plurality of scripts for carrying out functions of the IP configuration system 103. Instructions of the plurality of scripts can be stored in the storage 100 and be executed by the processor 101. The plurality of scripts can include a starting script 201, an accepting script 202, a determining script 203, an authenticating script 204, a servicing script 205, and an allocating script 206. The scripts 201-206 can include one or more software programs in the form of computerized codes stored in the storage 100. The computerized codes can include scripts executed by the processor 101 to provide functions for the scripts 201-206.

The small cell 10 can receive a local IP address for connecting to the local network 60. In at least one embodiment, the local IP address can be assigned to the small cell 10 by a DHCP function (not shown) implemented in the small cell 10. In another embodiment, the local IP address can be assigned to the small cell 10 by the DHCP function being implemented in a DHCP server (not shown) of an access point (not shown) of the local network 60. When the DHCP function is implemented in the small cell 10, the starting script 201 can start the DHCP function when a user of the small cell 10 logs into an interface of the small cell 10 to manually turn on the DHCP function. When the DHCP function is implemented in the DHCP server of the access point of the local network 60, the receiving script 202 can transmit a request to the DHCP server to request the DHCP server to assign the local IP address to the small cell 10.

The determining script 203 can determine whether the core network 50 has priority over the local network 60 to connect to the small cell 10. When the core network 50 has priority over the local network 60, the small cell 10 can use a core network IP address assigned by the core network 50. When the local network 60 has priority over the core network 50, the small cell 10 can use the local IP address assigned by the local network 60. In at least one embodiment, whether the core network 50 or the local network 60 has priority can be predetermined by a user of the small cell 10. When the DHCP function is implemented in the DHCP server, the servicing script 205 can use either the local IP address or the core network IP address according to whether the local network 60 or the core network 50 has priority.

When the DHCP function is implemented in the DHCP server of the access point of the local network, the determining script 203 can determine whether the received local IP address and the core network IP address are the same. If the local IP address is the same as the core network IP address, the small cell 10 can request the DHCP server of the access point of the local network to assign a different local IP address to the small cell 10.

When the DHCP function is implemented in the small cell 10, the determining script 203 determines whether the small cell 10 has received the local IP address. In at least one embodiment, the determining script 203 determines whether the small cell 10 has received the local IP address according to whether the small cell 10 has joined the local network 60. The assigning script 206 can assign the local IP address to the small cell 10.

Figure 5:
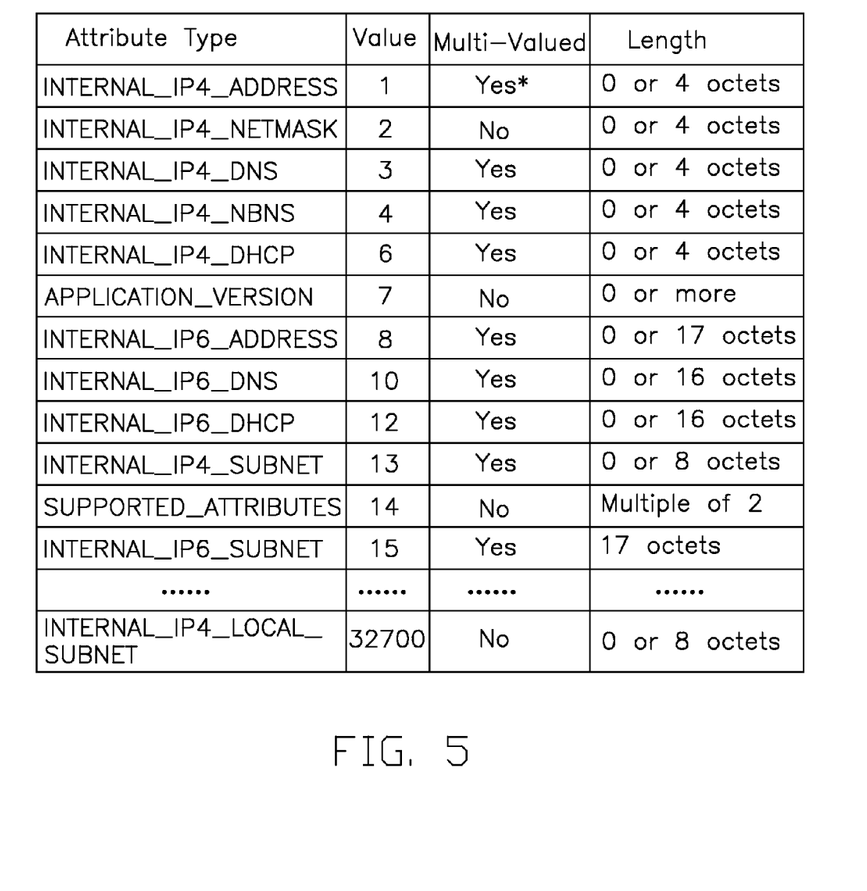
FIG. 5 is a table of a plurality of attribute types having an added attribute type of the present disclosure.

The determining script 203 can determine whether the small cell 10 has received authorization from the core network 50 to connect to the core network 50. In at least one embodiment, the determining script 203 determines whether authorization has been received from the core network 50 according to a length of an attribute type contained in an authorization load response transmitted to the small cell 10 from the secure gateway 20. As illustrated in FIG. 5, the attribute type in consideration for determining whether the small cell 10 has received authorization is an attribute type called, "INTERNAL_IP4_LOCAL_SUBNET." If a length of the attribute type is zero octets, then the small cell 10 has not received authorization from the core network 50. If the length of the attribute type is eight octets, then the small cell 10 has received authorization from the core network 50.

The authenticating script 204 can start a process for the small cell 10 to receive authentication from the core network 50. The process of the small cell 10 receiving authentication from the core network 50 is based on IPSec technology.

Figure 3:
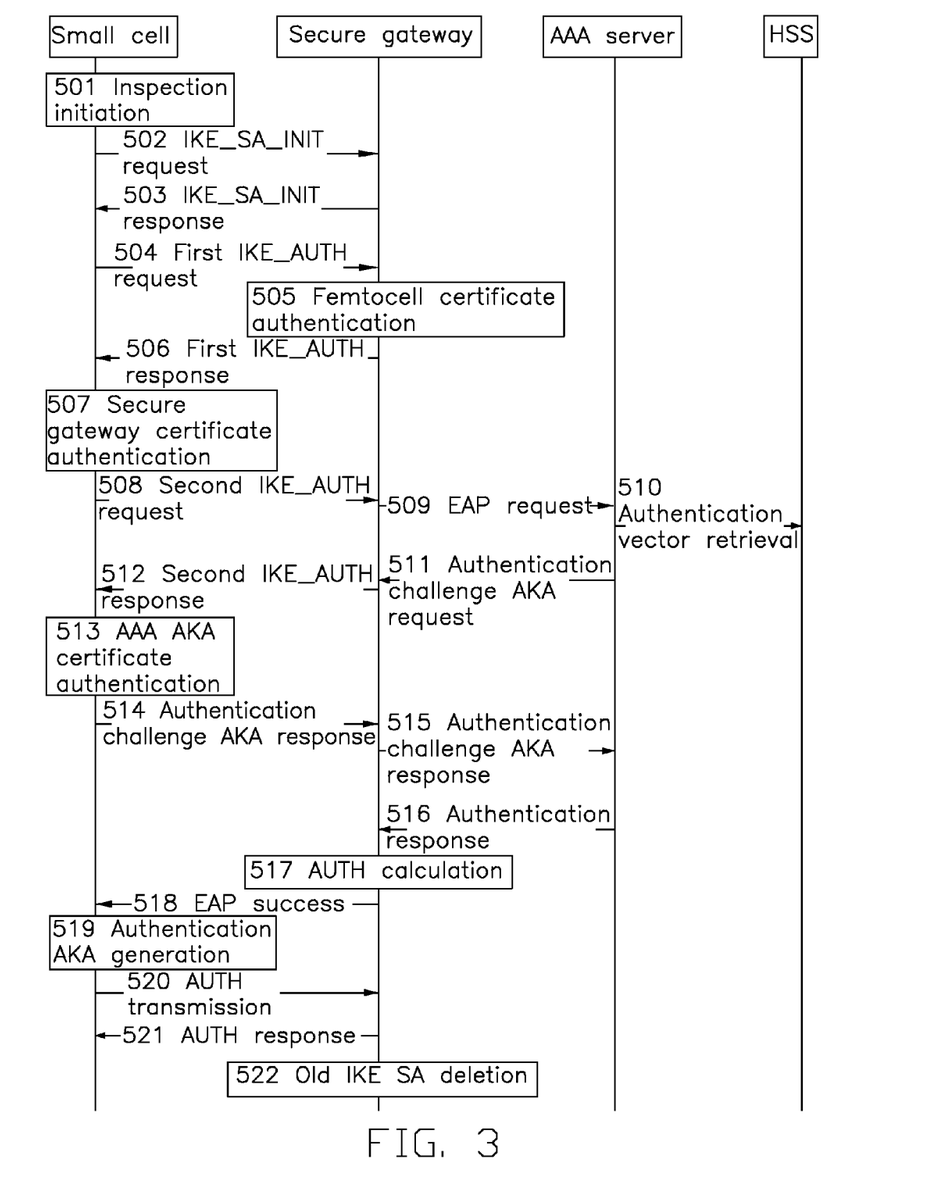
FIG. 3 is a flowchart of an embodiment of a process for the small cell to receive authorization from a core network.
Figure 4:
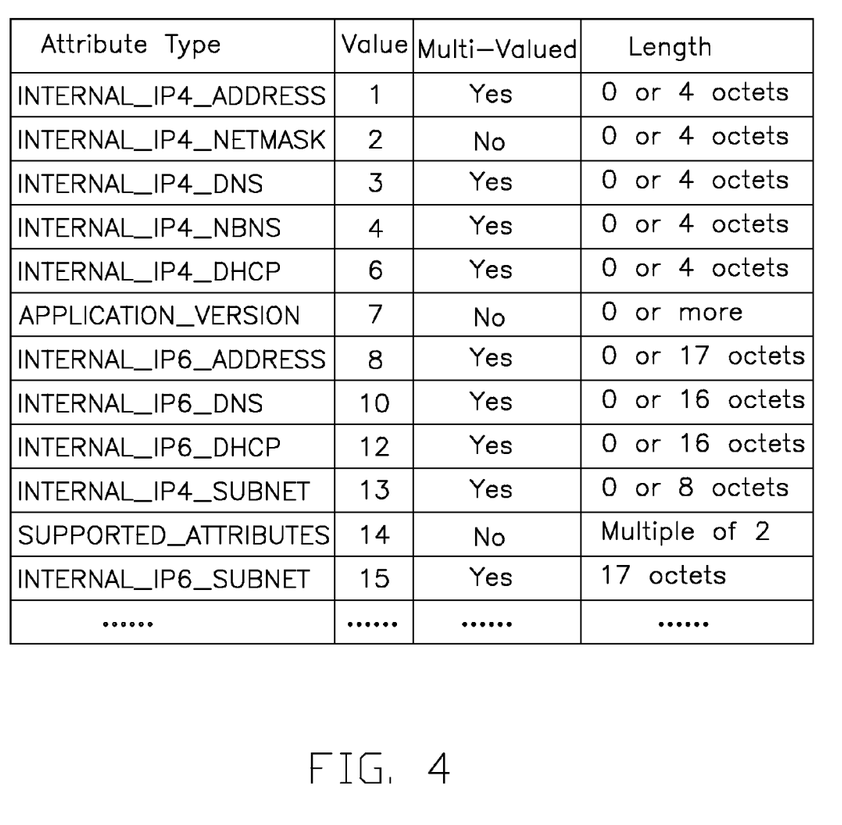
FIG. 4 is a table of a plurality of attribute types of the prior art.

FIG. 3 illustrates the process for the small cell 10 to receive authentication from the core network 50.

In block 501, the small cell 10 can initiate and execute an equipment integrity inspection of the small cell 10.

In block 502, the small cell 10 can transmit, after completing the equipment integrity inspection, an Internet key exchange security association initiation (IKE_SA_INIT) request to the secure gateway. The IKE_SA_INIT request can include a session key (SK) and encryption key exchange materials.

In block 503, the secure gateway 20 can transmit, to the small cell 10, an IKE_SA_NIT response and a request for a certificate of the small cell 10.

Figure 6:
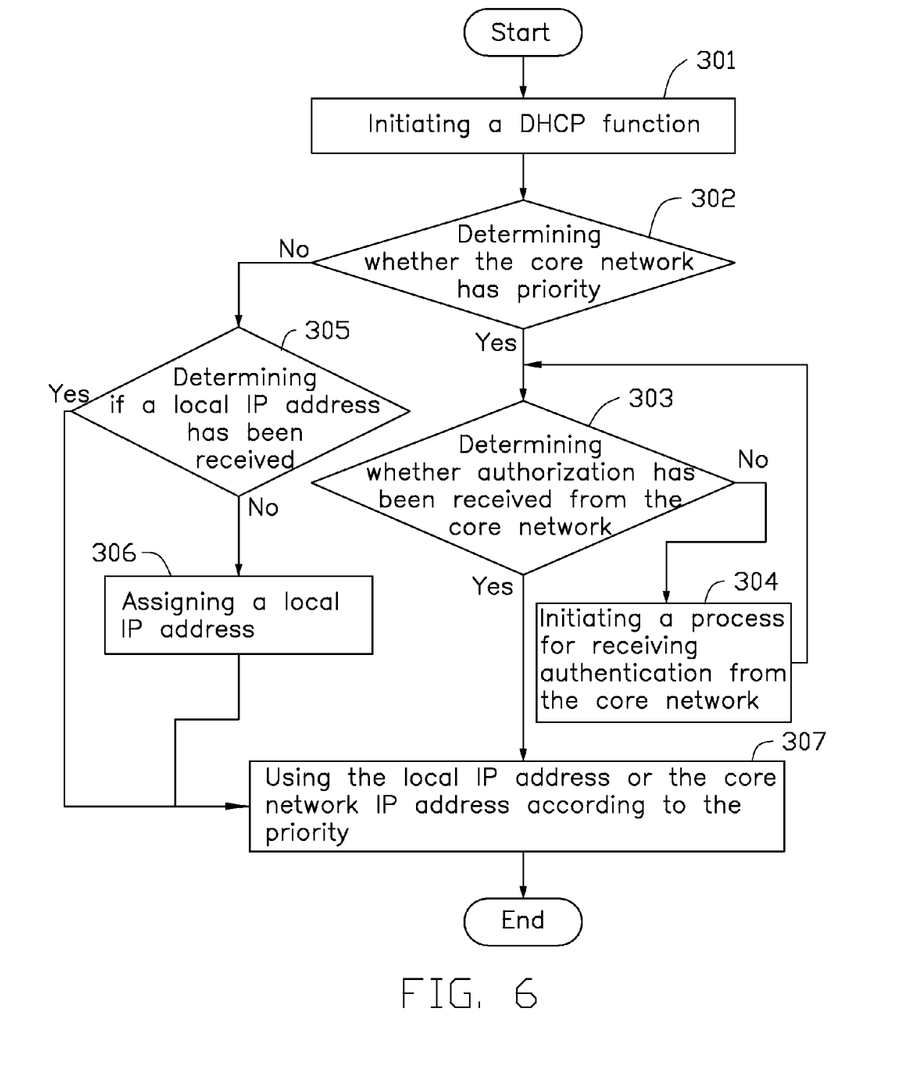
FIG. 6 is a flowchart of an embodiment of a method for configuring an IP address of a small cell implementing a dynamic host configuration protocol (DHCP) function.
Figure 7:
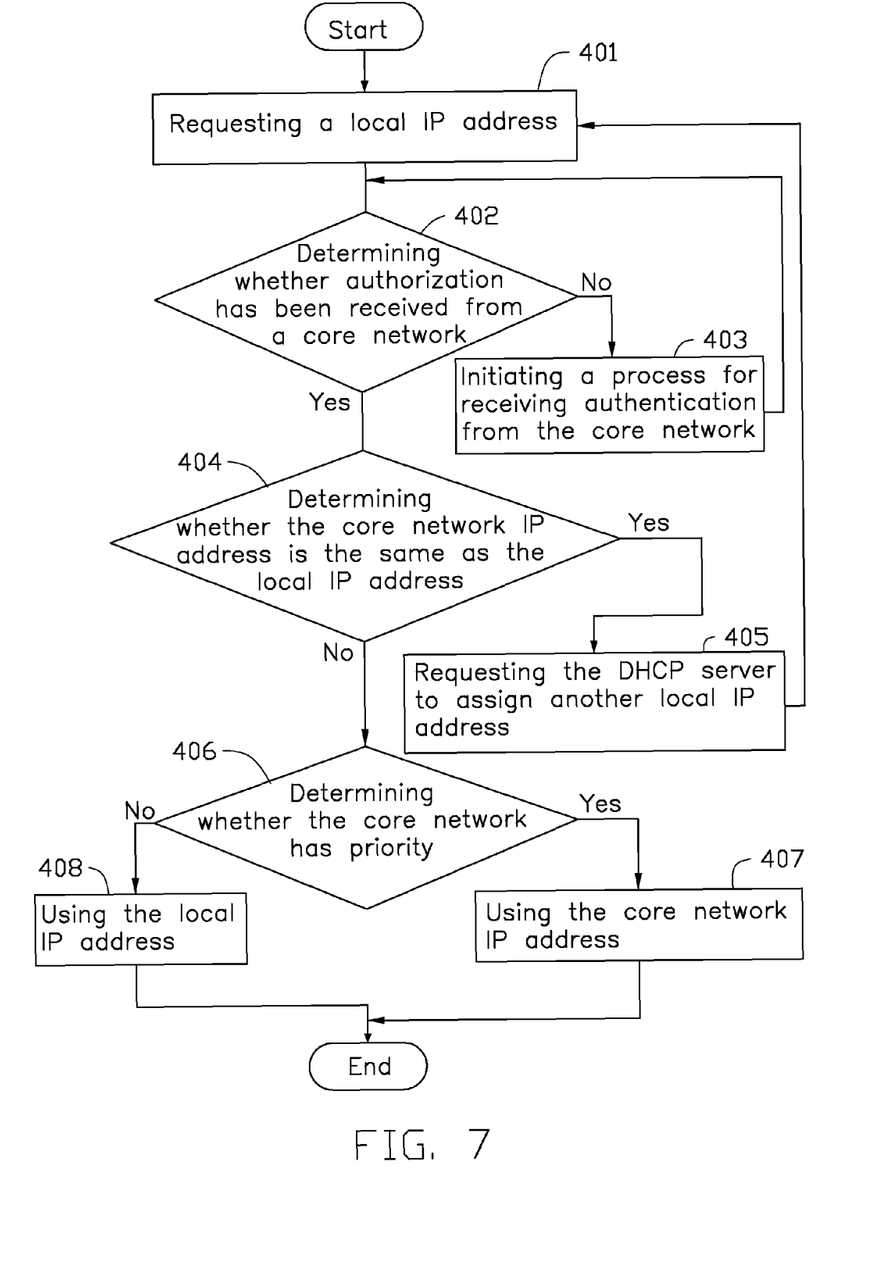
FIG. 7 is a flowchart of an embodiment of a method for configuring an IP address of a small cell not implementing the DHCP function.

In block 504, the small cell 10 can transmit, to the secure gateway 20, a first Internet key exchange initiation (IKE_INIT) request including the certificate of the small cell 10, a certificate comprising the ID information of the small cell 10, an authentication (AUTH), and the SK of the small cell 10. The SK can include a configuration payloads request (CP_REQUEST). The CP_REQUEST can include an IP address request. FIG. 6 illustrates a plurality of attribute types known in the art of the CP_REQUEST. FIG. 7 illustrates a new attribute type INTERNAL_IP4_LOCAL_SUBNET added in the present disclosure. If the small cell 10 has not received the local IP address from the DHCP function, the length of the INTERNAL_IP4_LOCAL_SUBNET is zero octets. If the small cell 10 has received the local IP address from the DHCP function, the length of the INTERNAL_IP4_LOCAL_SUBNET is eight octets.

In block 505, the secure gateway 20 can check a validity of the AUTH received from the small cell 10.

In block 506, the secure gateway 20 can transmit to the small cell 10 a first IKE_NIT response including identity information, AUTH, and a certificate of the secure gateway 20.

The blocks 502 and 503 can constitute an initial IKE_SA_NIT exchange for negotiating an encryption algorithm. The blocks 504 and 506 can constitute an initial IKE_AUTH exchange for authenticating information of the initial IKE_SA_INIT exchange. The small cell 10 and the secure gateway 20 can exchange corresponding information and corresponding certificates with each other to establish an IKE_SA.

In block 507, the small cell 10 can authenticate, according to a root certificate prestored in the small cell 10, the certificate of the secure gateway 20. The root certificate can be a public key certificate to be signed by the secure gateway 20 or a self-signing certificate of the secure gateway 20.

In block 508, the small cell 10 can transmit to the secure gateway 20 a second IKE_AUTH request comprising the ID information of the small cell 10. In at least one embodiment, the second IKE_AUTH request is for implementing an extensible authentication protocol (EAP).

In block 509, the secure gateway 20 can transmit to the AAA server 30 an empty EAP request including the ID information of the small cell 10 received in block 508.

In block 510, the AAA server 30 can obtain from the HSS 40 user information and an authentication vector, the authentication vector comprising a challenge random number (RAND), an authentication token (AUTN), an authentication challenge, a cipher key (CK), and an integrity key (IK);

In block 511, the AAA server 30 can transmit to the secure gateway 20 an extensible authentication protocol and authentication and key agreement (EAP/AKA) request including the authentication challenge, the authentication challenge being in the form of an extensible authentication protocol request and authentication and key agreement challenge (EAP-Request/AKA-Challenge) message.

In block 512, the secure gateway 20 can transmit to the small cell 10 a second IKE_AUTH response including the EAP-Request/AKA-Challenge message received from the AAA server 30.

In block 513: the small cell 10 can authenticate an authentication challenge certificate of the AAA server 30.

In block 514, the small cell 10 can transmit to the secure gateway 20 an EAP/AKA response comprising the authentication challenge, the authentication challenge being in the form of an extensible authentication protocol response and authentication and key agreement challenge (EAP-Response/AKA-Challenge) message. When the small cell 10 authenticates the secure gateway 20 according to the certificate of the secure gateway 20, the small cell 10 can inspect the AUTH received from the secure gateway 20.

In block 515, the secure gateway 20 can transmit to the AAA server 30 the EAP-Response/AKA-Challenge message received from the small cell 10.

In block 516, the AAA server 30 can transmit to the secure gateway 20 an authentication response including an EAP success message and encryption key materials. The encryption key materials include a first main session key (MSK).

In block 517: the secure gateway 20 can calculate an AUTH for authenticating the IKE_SA_NIT according to the first MSK.

In block 518, the secure gateway 20 can transmit to the small cell 10 the EAP success message.

In block 519, the small cell 10 can generate, according to a second MSK of the small cell 10 prestored in the small cell 10, an authentication AKA message by setting the second MSK as an input parameter.

In block 520, the small cell 10 can transmit to the secure gateway 20 a third IKE_AUTH request.

In block 521, the secure gateway 20 can authenticate a validity of the AUTH received from the small cell 10 and transmit to the small cell 10 a third IKE_AUTH response. The third IKE_AUTH response includes SK information. The SK information includes a configuration payloads reply (CP_REPLY). The length of the attribute type INTERNAL_IP4_LOCAL_SUBNET can be zero octets or eight octets to represent whether the small cell 10 receives authorization from the core network 50.

In block 522, the secure gateway 20 can delete an old IKE_SA of the small cell 10 when the secure gateway 20 detects that the small cell 10 has an old IKE_SA and transmit to the small cell 10 a delete message.

FIG. 6 illustrates a flowchart of a method for configuring an IP address of a small cell implementing a DHCP function. The example method is provided by way of example, as there are a variety of ways to carry out the method. The method described below can be carried out using the configurations illustrated in FIGS. 1-5, for example, and various elements of these figures are referenced in explaining the example method. Each block shown in FIG. 6 represents one or more processes, methods, or subroutines carried out in the example method. Furthermore, the illustrated order of blocks is by example only, and the order of the blocks can be changed. Additional blocks can be added or fewer blocks can be utilized without departing from this disclosure. The example method can begin at block 301.

At block 301, a user of the small cell can open a DHCP function of the small cell. In detail, the user of the small cell can log into an interface of the small cell to manually turn on the DHCP function.

At block 302, the small cell can determine if a core network has priority over a local network for connecting to the small cell. In at least one embodiment, whether the core network or the local network has priority can be predetermined by a user of the small cell. When the core network has priority over the local network, block 303 is implemented. When the core network does not have priority over the local network, block 305 is implemented.

At block 303, the small cell can determine if authorization has been received from the core network. In at least one embodiment, the small cell determines whether authorization has been received from the core network according to a length of an attribute type contained in an authorization load response transmitted to the small cell from a secure gateway. The attribute type in consideration for determining whether the small cell has received authorization is an attribute type called, "INTERNAL_IP4_LOCAL_SUBNET." If a length of the attribute type is zero octets, then the small cell has not received authorization from the core network. If the length of the attribute type is eight octets, then the small cell has received authorization from the core network. When the small cell has received authorization, block 307 is implemented. When the small cell has not received authorization, block 304 is implemented.

At block 304, the small cell can initiate an authorization process for the small cell to receive authorization from the core network.

At block 305, the small cell can determine if a local IP address has been received from the DHCP function. In at least one embodiment, the small cell determines whether the local IP address has been received from the DHCP function according to whether the small cell is connected to the local network. When the small cell has received the local IP address, block 307 is implemented. When the small cell has not received the local IP address, block 306 is implemented.

At block 306, the DHCP function can assign a local IP address to the small cell.

At block 307, the small cell uses either the local IP address or the core network IP address to connect to the local network or the core network, respectively, according to whether the core network or the local network has priority.

FIG. 7 illustrates a flowchart of a method for configuring an IP address of a small cell not implementing a DHCP function. The example method is provided by way of example, as there are a variety of ways to carry out the method. The method described below can be carried out using the configurations illustrated in FIGS. 1-5, for example, and various elements of these figures are referenced in explaining the example method. Each block shown in FIG. 7 represents one or more processes, methods, or subroutines carried out in the example method. Furthermore, the illustrated order of blocks is by example only, and the order of the blocks can be changed. Additional blocks can be added or fewer blocks can be utilized without departing from this disclosure. The example method can begin at block 401.

At block 401, the small cell can request a DHCP server to assign a local IP address to the small cell. In at least one embodiment, the DHCP server is implemented in an access point of a local network connected to the small cell.

At block 402, the small cell can determine if authorization has been received from a core network to connect to the core network. In at least one embodiment, the small cell determines whether authorization has been received from the core network according to a length of an attribute type contained in an authorization load response transmitted to the small cell from a secure gateway. The attribute type in consideration for determining whether the small cell has received authorization is an attribute type called, "INTERNAL_IP4_LOCAL_SUBNET." If a length of the attribute type is zero octets, then the small cell has not received authorization from the core network. If the length of the attribute type is eight octets, then the small cell has received authorization from the core network.

At block 403, the small cell can initiate a process for receiving authorization from the core network.

At block 404, the small cell can determine whether the core network IP address is the same as the local IP address. When the core network IP address is the same as the local IP address, block 405 is implemented. When the core network IP address is not the same as the local IP address, block 406 is implemented.

At block 405, the small cell can request the DHCP server to assign another local IP address to the small cell.

At block 406, the small cell can determine whether the core network has priority over the local network for connecting to the small cell. In at least one embodiment, whether the core network or the local network has priority can be predetermined by a user of the small cell. When the core network has priority, block 407 is implemented. When the core network does not have priority, block 408 is implemented.

At block 407, the small cell can use the core network IP address to connect to the core network.

At block 408, the small cell can use the local IP address to connect to the local network.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A method for configuring an Internet protocol (IP) address of a small cell, the method comprising:
   determining, by the small cell, whether the small cell has received authorization from a core network of a mobile operator, wherein the small cell determines whether authorization has been received from the core network according to a length of an attribute type contained in an authorization load response transmitted to the small cell from a secure gateway;
   determining, by the small cell, whether the core network has priority over a local network to connect to the small cell;
   obtaining, by the small cell, a local IP address from a dynamic host configuration protocol (DHCP) function implemented in the small cell or in an access point of the local network of the small cell;
   using, by the small cell when the core network has priority over the local network, a core network IP address assigned to the small cell by the core network;
   using, by the small cell when local network has priority over the core network, the local IP address;
   determining, by the small cell, whether the core network IP address is the same as the local IP address; and
   requesting, by the small cell when the core network IP address is the same as the local IP address, another IP address to be assigned to the small cell.

2. The method as in claim 1, wherein whether the core network or the local network has priority is predetermined.

3. The method as in claim 1, wherein the secure gateway receives the core network IP address from the core network and packages the core network IP address together with the attribute type in the authorization load response transmitted to the small cell.

4. The method as in claim 3, wherein the small cell is authorized by:
   initiating and executing, by the small cell, an equipment integrity inspection of the small cell;
   transmitting, by the small cell after completing the equipment integrity inspection, an Internet key exchange security association initiation (IKE_SA_INIT) request to the secure gateway, the IKE_SA_INIT request comprising a session key (SK) and encryption key exchange materials;
   receiving, by the small cell from the secure gateway, an IKE_SA_INIT response and a request for a certificate of the small cell;
   transmitting, by the small cell to the secure gateway, a first Internet key exchange initiation (IKE_INIT) request comprising the certificate of the small cell, a certificate comprising identification information of the small cell, an authentication (AUTH), and the SK of the small cell;
   checking, by the secure gateway, a validity of the AUTH received from the small cell;
   transmitting, by the secure gateway to the small cell, a first IKE_INIT response comprising identity information, AUTH, and a certificate of the secure gateway;
   authenticating, by the small cell according to a root certificate prestored in the small cell, the certificate of the secure gateway;
   transmitting, by the small cell to the secure gateway, a second IKE_AUTH request comprising the identification information of the small cell;
   transmitting, by the secure gateway to an authentication, authorization, and accounting (AAA) server, an empty extensible authentication protocol (EAP) request comprising the identification information of the small cell;
   obtaining, by the AAA server from a home subscriber server (HSS), user information and an authentication vector, the authentication vector comprising a challenge random number (RAND), an authentication token (AUTN), an authentication challenge, a cipher key (CK), and an integrity key (IK);
   transmitting, by the AAA server to the secure gateway, an extensible authentication protocol and authentication and key agreement (EAP/AKA) request comprising the authentication challenge, the authentication challenge being in the form of an extensible authentication protocol request and authentication and key agreement challenge (EAP-Request/AKA-Challenge) message;
   transmitting, by the secure gateway to the small cell, a second IKE_AUTH response comprising the EAP-Request/AKA-Challenge message received from the AAA server;

authenticating, by the small cell, an authentication challenge certificate of the AAA server;
transmitting, by the small cell to the secure gateway, an EAP/AKA response comprising the authentication challenge, the authentication challenge being in the form of an extensible authentication protocol response and authentication and key agreement challenge (EAP-Response/AKA-Challenge) message;
transmitting, by the secure gateway to the AAA server, the EAP-Response/AKA-Challenge message received from the small cell;
transmitting, by the AAA server to the secure gateway, an authentication response comprising an EAP success message and encryption key materials, the encryption key materials comprising a first main session key (MSK);
calculating, by the secure gateway, an AUTH for authenticating the IKE_SA_INIT according to the first MSK;
transmitting, by the secure gateway to the small cell, the EAP success message;
generating, by the small cell according to a second MSK of the small cell prestored in the small cell, an authentication AKA message by setting the second MSK as an input parameter;
transmitting, by the small cell to the secure gateway, a third IKE_AUTH request;
authenticating, by the secure gateway, a validity of the AUTH received from the small cell, and transmitting, by the secure gateway to the small cell, a third IKE_AUTH response; and
deleting, by the secure gateway, an old IKE SA of the small cell when the secure gateway detects that the small cell has an old IKE SA, and transmitting, by the secure gateway to the small cell, a delete message.

5. A small cell implementing an Internet protocol (IP) configuration system, the small cell comprising:
a storage configured to store a plurality of scripts of an IP configuration system; and
a processor configured to implement the plurality of scripts of the IP configuration system;
wherein the plurality of scripts of the IP configuration system is configured to:
request and receive a local IP address from an access point of a local network of the small cell;
determine, when the small cell has received authorization from a core network of a mobile operator, whether the local IP address is the same as a core network IP address assigned to the small cell by the core network, wherein the small cell determines whether authorization has been received from the core network according to a length of an attribute type contained in an authorization load response transmitted to the small cell from a secure gateway;
determine whether the core network has priority over the local network; and
use the core network IP address when the core network has priority over the local network;
wherein the small cell is in wireless communication with at least one user terminal.

6. The small cell as in claim 5, wherein whether the core network or the local network has priority is predetermined.

7. The small cell as in claim 6, wherein the local IP address is assigned to the small cell by a dynamic host configuration protocol (DHCP) function implemented in the small cell or in a DHCP server of an access point of the local network.

8. The small cell as in claim 7, wherein when the local IP address is the same as the core network IP address, the small cell requests the access point of the local network to assign another local IP address to the small cell.

9. The small cell as in claim 5, wherein the small cell receives the core network IP address together with the attribute type from the authorization load response.

10. The small cell as in claim 9, wherein the plurality of scripts of the IP configuration system comprises:
a starting script configured to start the DHCP function implemented in the small cell;
an accepting script configured to request the access point of the local network to assign the local IP address to the small cell when the DHCP function is implemented in the DHCP server of the access point;
a determining script configured to determine whether the core network or the local network has priority, whether the small cell has received authorization from the core network, whether the small cell has been assigned a local IP address, and whether the local IP address is the same as the core network IP address;
an authenticating script configured to start a process for receiving authentication from the core network;
a servicing script configured to accept either the local IP address or the core network IP address according to whether the local network or the core network has priority; and
an assigning script configured to assign the local IP address to the small cell.

11. The small cell as in claim 10, wherein the small cell is authorized by:
initiating and executing, by the small cell, an equipment integrity inspection of the small cell;
transmitting, by the small cell after completing the equipment integrity inspection, an Internet key exchange security association initiation (IKE_SA_INIT) request to the secure gateway, the IKE_SA_INIT request comprising a session key (SK) and encryption key exchange materials;
transmitting, by the secure gateway to the small cell, an IKE_SA_INIT response and a request for a certificate of the small cell;
transmitting, by the small cell to the secure gateway, a first Internet key exchange initiation (IKE_INIT) request comprising the certificate of the small cell, a certificate comprising identification information of the small cell, an authentication (AUTH), and the SK of the small cell;
checking, by the secure gateway, a validity of the AUTH received from the small cell;
transmitting, by the secure gateway to the small cell, a first IKE_INIT response comprising identity information, AUTH, and a certificate of the secure gateway;
authenticating, by the small cell according to a root certificate prestored in the small cell, the certificate of the secure gateway;
transmitting, by the small cell to the secure gateway, a second IKE_AUTH request comprising the identification information of the small cell;
transmitting, by the secure gateway to an authentication, authorization, and accounting (AAA) server, an empty extensible authentication protocol (EAP) request comprising the identification information of the small cell;
obtaining, by the AAA server from a home subscriber server (HSS), user information and an authentication vector, the authentication vector comprising a challenge random number (RAND), an authentication token (AUTN), an authentication challenge, a cipher key (CK), and an integrity key (IK);

transmitting, by the AAA server to the secure gateway, an extensible authentication protocol and authentication and key agreement (EAP/AKA) request comprising the authentication challenge, the authentication challenge being in the form of an extensible authentication protocol request and authentication and key agreement challenge (EAP-Request/AKA-Challenge) message;

transmitting, by the secure gateway to the small cell, a second IKE_AUTH response comprising the EAP-Request/AKA-Challenge message received from the AAA server;

authenticating, by the small cell, an authentication challenge certificate of the AAA server;

transmitting, by the small cell to the secure gateway, an EAP/AKA response comprising the authentication challenge, the authentication challenge being in the form of an extensible authentication protocol response and authentication and key agreement challenge (EAP-Response/AKA-Challenge) message;

transmitting, by the secure gateway to the AAA server, the EAP-Response/AKA-Challenge message received from the small cell;

transmitting, by the AAA server to the secure gateway, an authentication response comprising an EAP success message and encryption key materials, the encryption key materials comprising a first main session key (MSK);

calculating, by the secure gateway, an AUTH for authenticating the IKE_SA_INIT according to the first MSK;

transmitting, by the secure gateway to the small cell, the EAP success message;

generating, by the small cell according to a second MSK of the small cell prestored in the small cell, an authentication AKA message by setting the second MSK as an input parameter;

transmitting, by the small cell to the secure gateway, a third IKE_AUTH request;

authenticating, by the secure gateway, a validity of the AUTH received from the small cell, and transmitting, by the secure gateway to the small cell, a third IKE_AUTH response; and deleting, by the secure gateway, an old IKE SA of the small cell when the secure gateway detects that the small cell has an old IKE SA, and transmitting, by the secure gateway to the small cell, a delete message.

* * * * *